(12) United States Patent
Lindeman et al.

(10) Patent No.: US 7,249,004 B2
(45) Date of Patent: Jul. 24, 2007

(54) MILL ROLL ANALYSIS SYSTEM

(75) Inventors: David D. Lindeman, Hudson, WI (US); Eric G. Almquist, Oakdale, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 791 days.

(21) Appl. No.: 10/376,727

(22) Filed: Feb. 28, 2003

(65) Prior Publication Data

US 2004/0172223 A1    Sep. 2, 2004

(51) Int. Cl.
*G06F 15/50* (2006.01)
*B21D 53/00* (2006.01)
*B21B 37/58* (2006.01)

(52) U.S. Cl. .............................. 703/1; 72/14.1; 29/895
(58) Field of Classification Search .................... 703/1; 72/14.1
See application file for complete search history.

(56) References Cited

U.S. PATENT DOCUMENTS

| | | | |
|---|---|---|---|
| 4,691,548 A * | 9/1987 | Richter et al. ............... | 72/14.1 |
| 5,669,941 A | 9/1997 | Peterson | |
| 5,797,288 A | 8/1998 | Mas | |
| 6,262,739 B1 | 7/2001 | Migdal et al. | |
| 6,300,261 B1 | 10/2001 | Young et al. | |
| 6,434,492 B1 | 8/2002 | Pollack et al. | |
| 6,438,534 B1 | 8/2002 | Sörgel | |

2002/0188622 A1    12/2002    Wallen et al.

OTHER PUBLICATIONS

Koons et al., "A Study of Rollin-Mill Productivity Utilizing a Statistically Designed Simulation Experiment" 1977 Winter Simulation Conference p. 813-822.*
Abee et al., "Finite Simulation for Optimum Tube Mill Roll Design" 2000 CSA Illumina p. 535-538.*
Cutkosky et al., "Madefast: Collaborative Engineering over the Internet" 1996 Communications of the ACM p. 78-87.*
ANSYS/Structural Software, brochure, www.ansys.com, 2000 p. 1-2.*
Kugi et al., "Active Compensation of Roll Eccentricity in Rolling Mills" 1998 IEEE p. 2199-2206.*

* cited by examiner

*Primary Examiner*—Anthony Knight
*Assistant Examiner*—Tom Stevens

(57) ABSTRACT

A mill roll analysis system is described that includes a user interface module, a structural analysis engine, and an analysis control script. The user interface module receives mill roll design data from a remote user via a computer network. The analysis control script automatically directs the structural analysis engine to define and evaluate an appropriate analytical model for the mill roll design based on the mill roll design data. The mill roll analysis system presents an intuitive web-based interface for capturing the mill roll design data, and may present predefined mill roll applications and mill roll types for selection for the user. As a result, the remote user need not be familiar with the underlying analytical modeling techniques, which may be highly-complex by nature. Consequently, a user may utilize the system to evaluate and improve mill roll design in order to achieve increased product performance.

53 Claims, 16 Drawing Sheets

FIG. 3

Mass Properties — 113

| | | | — 116 | | |
|---|---|---|---|---|---|
| Mass Of Mill Roll Cover | 0.706E+06 | g | | 320.168 | lbs |
| Mass Of Shaft | 0.161E+07 | g | | 728.018 | lbs |
| IXX | 0.125E+18 | g mm² | | 0.193E+09 | lb in² |
| IYY | 0.125E+18 | g mm² | | 0.193E+09 | lb in² |
| IZZ | 0.196E+15 | g mm² | | 0.304E+06 | lb in² |

Results — 120

| | | | | | |
|---|---|---|---|---|---|
| Maximum Shaft Displacement | 0.621 | mm | | 0.024 | in |
| Maximum Shaft Stress | 93.491 | MPa | | 13560.334 | psi |
| Factor Of Safety | 3.260 | | | | |
| Maximum Compressive Stress | -3.125 | MPa | | -453.206 | psi |
| Maximum Tensile Stress | 0.104 | MPa | | 15.108 | psi |
| Maximum Contact Pressure | 2.964 | MPa | | 429.956 | psi |
| Bearing Load | 10816.712 | N | | 2431.815 | lbs |

↙ 112

| | | | | |
|---|---|---|---|---|
| Mill Roll Application | Pinch/Feed | | | |
| Mill Roll Orientation | Horizontal | | | |
| Mill Roll Type | Neutral | | | |
| Mill Roll Density | 3 | | | |
| Mill Roll Profile | Crowned | | | |
| Mill Roll Minimum Diameter | 406.000 | mm | 15.984 | in |
| Mill Roll Maximum Diameter | 416.000 | mm | 16.378 | in |
| Shaft Type | Hollow | | | |
| Shaft Material | DIN 1.1121 | | AISI 1010 | |
| Shaft Yield Strength | 304.733 | MPa | 44200.000 | psi |
| Shaft Inner Diameter | 309.600 | mm | 12.189 | in |
| Shaft Outer Diameter | 350.000 | mm | 13.780 | in |
| Shaft Inner Length | 1252.000 | mm | 49.291 | in |
| Shaft Outer Length | 1372.000 | mm | 54.016 | in |
| Key Type | Reverse | | | |
| Number Of Keys | 6 | | | |
| Key Width | 19.050 | mm | 0.750 | in |
| Key Height | 6.350 | mm | 0.250 | in |
| Gudgeon Type | Stepped | | | |
| Number Of Gudgeon Steps | 1 | | | |
| Gudgeon Stub Diameter | 150.000 | mm | 5.906 | in |
| Gudgeon Stub Length | 100.000 | mm | 3.937 | in |
| Gudgeon Fillet Radius | 25.000 | mm | 0.984 | in |
| Gudgeon Bearing Diameter | 100.000 | mm | 3.937 | in |
| Gudgeon Bearing Length | 100.000 | mm | 3.937 | |
| Strip Width | 800.000 | mm | 31.496 | in |
| Strip Thickness | 3.000 | mm | 0.118 | in |
| Cylinder Type | Push action | | | |
| Number Of Cylinders | 2 | | | |
| Cylinder Pressure | 100.000 | bar | 1450.450 | psi |
| Cylinder Diameter | 100.000 | mm | 0.155 | in |
| Cylinder Efficiency | 1.000 | | | |
| Mechanical Advantage | 1.000 | | | |
| Cylinder Force | 0.785E+05 | N | 0.177E+05 | lbs |
| Operating Temperature | 30.000 | C | 86.000 | F |
| Number Of Cylinders | 2 | | | |
| Cylinder Pressure | 100.000 | bar | 1450.450 | psi |
| Cylinder Diameter | 100.000 | mm | 0.155 | in |
| Cylinder Efficiency | 1.000 | | | |
| Mechanical Advantage | 1.000 | | | |
| Cylinder Force | 0.785E+05 | N | 0.177E+05 | lbs |
| Operating Temperature | 30.000 | C | 86.000 | F |

FIG. 13

Conclusions

The maximum displacement of the shaft exceeds the recommended limit of 0.508 mm (0.020 in). Modificaton of the shaft dimensions or type should be considered.

The maximum stress in the shaft is less than the yield stress of the shaft material. Yield failure should not occur.

The maximum stress in the shaft is less than one-half the yield stress of the shaft material. Fatigue failure should not occur.

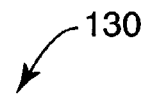

FIG. 16

MILL ROLL ANALYSIS SYSTEM

TECHNICAL FIELD

The invention generally relates to rolls for manufacturing and processing sheets and coils of metal.

BACKGROUND

Rotatable rolls, often referred to as "mill rolls," are commonly used in the manufacturing and processing of metal sheets and strips (e.g., coils) in continuous production lines. A mill roll typically includes a cover (e.g., a sleeve or coating), such as a non-woven cover, fitted around and fixed to a rotatable shaft. In typical processes using mill rolls, metal sheets or coils move over the mill rolls as the metal feeds through the production line. During this process, the metal subjects the mill rolls to stress and deflections that affect their performance, usable lifetime, or both. As a result, the design of a mill roll may greatly impact the performance and/or usable life of the mill roll.

The design of mill rolls has conventionally involved rough approximation, intuition, trial and error, or a combination thereof. Moreover, a common approach has been to construct and evaluate "test" mill rolls corresponding to various designs under consideration. According to this technique, actual mill rolls for use in the production line would be constructed based on the performance of the test mill rolls, and only after the test mill rolls were thoroughly evaluated. Consequently, this can be a time-consuming, labor-intensive process involving numerous iterations.

SUMMARY

In general, the invention is directed to techniques for evaluating the stresses and deflections occurring in mill rolls using advanced computational structural mechanics software. More specifically, a mill roll analysis system is described that provides an intuitive web-based interface that allows a remote user to select mill roll applications and mill roll coverings, and specify dimensions, materials, operating conditions, and other parametric data for a roll design. The mill roll analysis system automatically defines and evaluates an appropriate analytical model for the mill roll design based on the mill roll design data. As used herein, the term "analytical model" refers to any model (e.g., a numerical analysis model) that can be used to predict the structural and performance properties of a mill roll. Upon completion of the analysis, the mill roll analysis system produces a report that summarizes the analytical results produced by the analysis, may highlight deflections and/or stresses that may exceed specified limits. The mill roll analysis system may provide the report, for example, in electronic form for direct viewing via the web-based interface, or may communicate the report to the user, for example, via electronic mail.

In one embodiment, a system includes a user interface module, a structural analysis engine, and an analysis control script. The user interface module receives input data defining a mill roll design from a remote user via a computer network. The analysis control script automatically directs the structural analysis engine to define and evaluate an analytical model for the mill roll design based on the input data.

In another embodiment, a system includes a web browser executing on a remote computing device, and a mill roll analysis system coupled to the remote computing device via a network. The mill roll analysis system includes a web server and an application server. The web server provides an operating environment for a user interface module that presents a web-interface to receive input data defining a mill roll design from the remote client computing device. The application server provides an operating environment for an analysis control script and a structural analysis engine. The analysis control script automatically directs the structural analysis engine to define and evaluate an analytical model for the mill roll design based on the input data.

In another embodiment, a method comprises receiving input data from a remote user via a computer network, wherein the input data defines a mill roll design. The method further comprises invoking an analysis control script to automatically direct a structural analysis engine to define and evaluate an analytical model for the mill roll design based on the input data, and communicating an analysis report to the user that contains analytical results from the structural analysis engine.

In an another embodiment, a computer-readable medium comprises instructions to cause a programmable processor to present a web-interface to include a set of predefined mill roll applications and a set of predefined mill roll types for selection by a user, and automatically direct a structural analysis engine to define and evaluate an analytical model based on the selected mill roll application and mill roll type.

The system may provide one or more advantages. For example, as a result of the intuitive web-based interface, the remote user need not be familiar with the underlying analytical modeling techniques, which may be highly-complex by nature. The mill roll analysis system automatically defines and evaluates an appropriate analytical model for the mill roll design based on the mill roll design data. The user may, for example, easily select between a number of predefined mill roll applications and mill roll types, and may provide other specific parametric data related to the design. Consequently, a user may utilize the mill roll analysis system to evaluate and improve mill roll design, without having detailed knowledge of the underlying modeling techniques. As a result, the system helps ensure that a robust mill roll design is derived, thus increasing product performance.

These and other embodiments, including other systems, methods and computer-readable mediums that store instructions and data, are described in the specification and claims below. The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 3-11 are screen illustrations that depict an example user interface for capturing input data defining a mill roll design.

FIGS. 12-16 are screen illustrations that depict an example analysis report produced by the mill roll analysis system.

DETAILED DESCRIPTION

Figure 1:
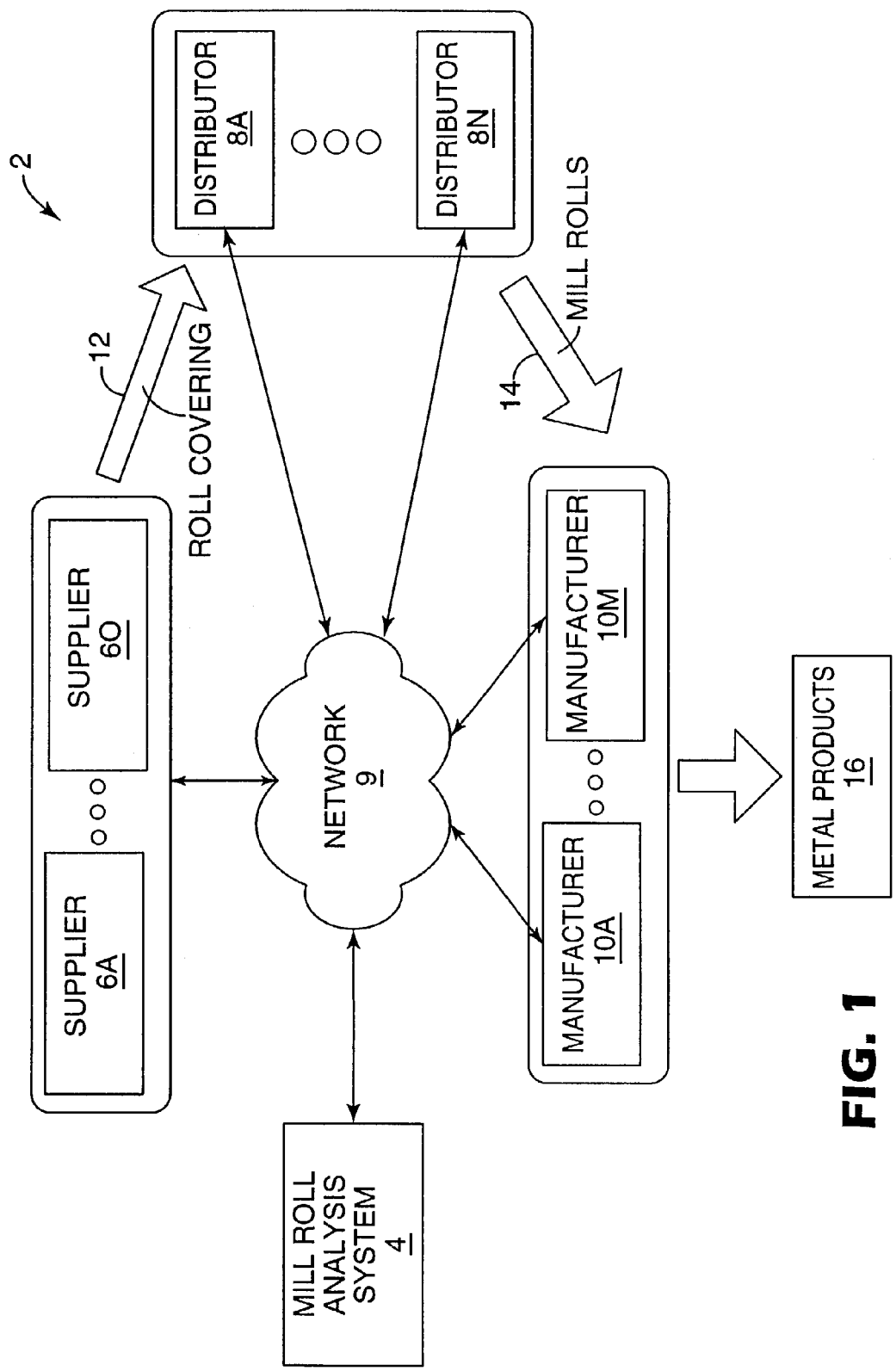
FIG. 1 is a block diagram illustrating an exemplary network-based environment for modeling and evaluating mill roll designs.

FIG. 1 is a block diagram illustrating an exemplary network-based environment 2 for modeling and evaluating mill roll designs. Mill roll analysis system 4, as described in detail herein, provides for network-based evaluation of the stresses and deflections of mill rolls under various operating conditions using advanced computational structural mechanics software.

As illustrated, roll covering suppliers 6A-6O ("suppliers 6") provide roll coverings 12 that are suitable for processing metal products 16, (e.g., steel sheets, metal sheets and steel coils), in continuous production lines. Examples of roll coverings 12 include non-woven coatings, rubber coatings, urethane coatings, fabrics, carbide coatings, and the like. Mill roll distributors 8A-8N ("distributors 8") make use of roll coverings 12 to assemble mill rolls 14 for use by metal manufacturers ("manufacturers 10") 10A-10M.

Manufacturers 10 use mill rolls 14 during the production of metal products 16. More specifically, manufacturers 10 utilize mill rolls 14 during the production process to control the process as metal products 16 feed through production lines.

Authorized users associated with suppliers 6, distributors 8, or manufacturers 10 may interact with mill roll analysis system 4 to model and evaluate mill roll designs. For example, a technical support engineer may utilize mill roll analysis system 4 to select and evaluate roll coverings 12 based on characteristics and operating conditions for a specific mill roll 14 being designed. As a result, the user may achieve a more robust mill roll design, thus achieving increased performance mill rolls 14.

Each user typically accesses mill roll analysis system 4 via network 9 using a remote computing device having suitable communication software, (e.g., a web browser). A user may access mill roll analysis system 4 using a network-enabled computing device such as, for example, a workstation, a personal computer, laptop computer, or a personal digital assistant (PDA,) such as, for example, an organizer marketed by Palm, Inc. of Santa Clara, Calif., under the trade designation "PALM". The communication device executes communication software, such as software marketed by Microsoft Corporation of Redmond, Wash., under the trade designation "INTERNET EXPLORER", in order to communicate with mill roll analysis system 4.

Figure 2:
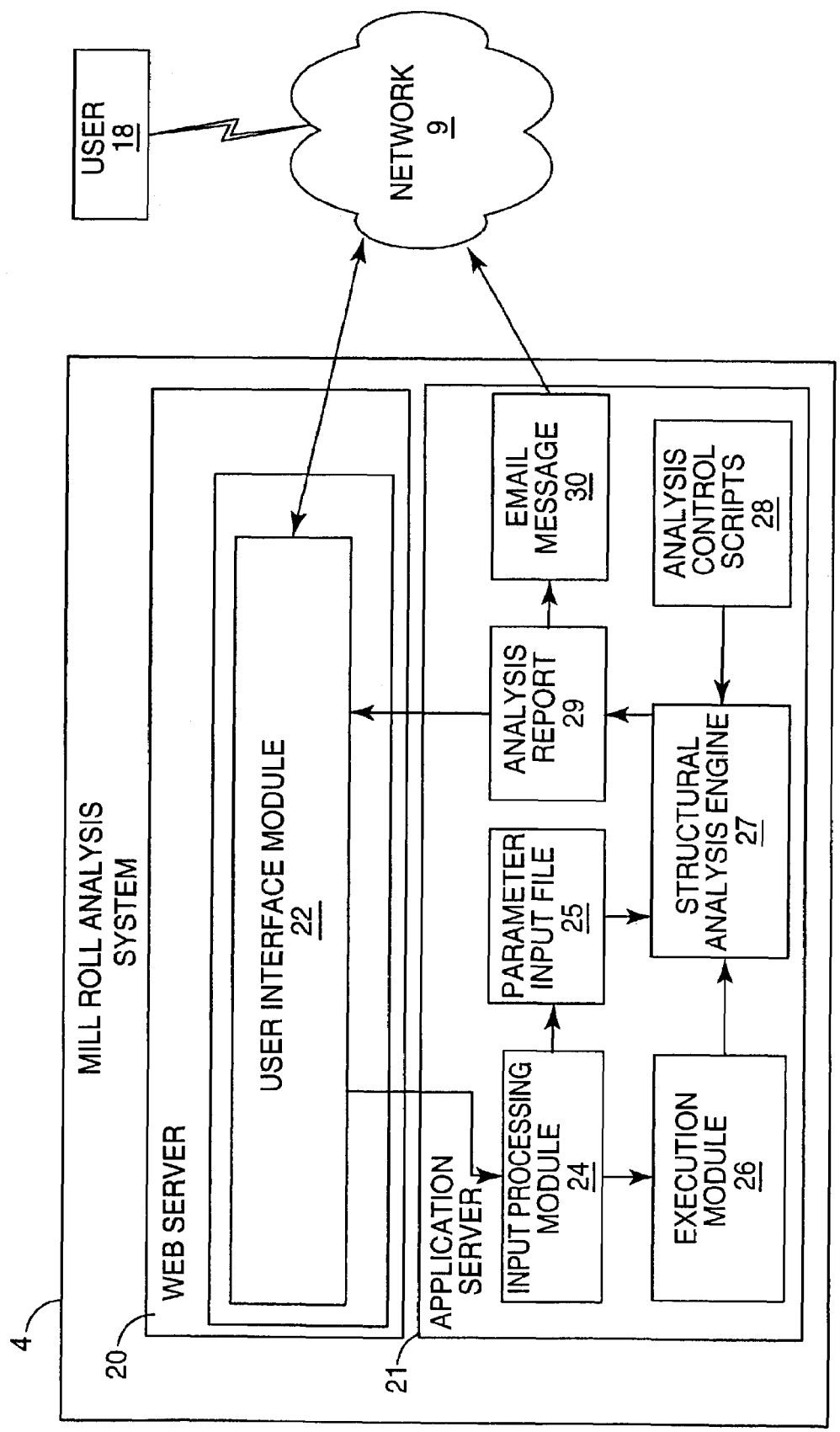
FIG. 2 is a block diagram illustrating an example embodiment of a mill roll analysis system.

FIG. 2 is a block diagram illustrating an example embodiment of mill roll analysis system 4 in further detail. In general, mill roll analysis system 4 includes one or more computing devices, e.g., computing servers that provide operating environments for various software modules. These servers can generally be categorized as one or more web servers 20 and one or more application servers 21. Although these servers are illustrated separately in FIG. 2 for exemplary purposes, mill roll analysis system 4 may be realized by a single computing device or a plurality of cooperating computing devices.

Web server 20 provides an interface by which an authorized user 18 communicates with mill roll analysis system 4 via network 9. In one configuration, web server 20 executes web server software, such as software marketed by Microsoft Corporation under the trade designation "INTERNET INFORMATION SERVER". As such, web server 20 provides an environment for interacting with at least one remote user 18 via user interface module 22. As described in detail below, user interface module 22 provide an intuitive, web-based interface for capturing input data defining a mill roll design. As described in detail below, user interface module 22 allows user 18 to select from a set of predefined mill roll applications and mill roll types, and provide other parametric data that defines a mill roll design to be analyzed. User interface module 22 may include Active Server Pages, web pages written in hypertext markup language (HTML) or dynamic HTML, Active X modules, Lotus scripts, Java scripts, Java Applets, Distributed Component Object Modules (DCOM), and the like.

Although illustrated as "server side" software modules executing within an operating environment provided by web server 20, user interface module 22 could readily be implemented as a "client-side" software module executing on computing devices of the remote users. User interface module 22 could be, for example, implemented as Active X components or Java scripts executed by a web browser for execution on the remote computing devices.

Application server 21 provides an operating environment for a number of application software modules that provide the underlying logic and functionality necessary for automatically modeling and evaluating a mill roll design. Specifically, application sever 21 provides an operating environment for an input processing module 24, an execution module 26, and a structural analysis engine 27.

Web server 20 invokes input processing module 24 when a user 18 interacts with user interface module 22 and submits input data defining a mill roll design. In response, input processing module 24 processes the data supplied by the user to create a temporary operating environment for evaluating an analytical model of the mill roll design. In particular, input processing module 24 creates a scratch directory, selects one of analysis control scripts 28 based on the type of mill roll application, and copies the selected analysis template into the scratch directory. In addition, input processing module 24 generates a parameter input file 25 based on the input received from user interface module 22. Parameter input file 25 specifies parameter values in a format suitable for processing by structural analysis engine 27. Finally, input processing module 24 spawns execution module 26, and returns control to user interface module 22.

Once spawned, execution module 26 initiates and provides high-level control over the execution of structural analysis engine 27. Structural analysis engine 27 provides a modeling environment for modeling and evaluating the input data specified within parameter input file 25, and may be any advanced computational structural mechanics software. An example of such software is a structural simulation software package marketed by Ansys, Inc. of Canonsburg, Pa., under the trade designation "ANSYS STRUCTURAL."

Once invoked, the selected analysis control script 28 processes the parameter values specified within parameter file 25, and interacts with structural analysis engine 27 to automatically generate and define the appropriate mill roll geometry, finite element mesh, material properties and loads. In other words, each analysis control script 28 may automatically direct structural analysis engine 27 to create an appropriate model based on the specific input data provided by user 18 and, in particular, the specific mill roll application, mill roll type, and other parametric data that defines the mill roll design.

In addition, the selected analysis control script 28 directs the structural analysis engine 27 to execute the analysis and perform the necessary post-processing to compute the desired analytical results. More specifically, analysis control script 28 interacts with structural analysis engine 27 to determine displacement values and stress values, and to create a variety of contour plots representing the computed analytical results. Analysis control script 28 generates analysis report 29 to include the output in a format that may be communicated to user 18. For example, report generator may write the results to a hypertext markup language (HTML) file, portable document format (PDF), or the like. Analysis control scripts 28 may be written in a script language suitable for interacting with structural analysis engine 27. One example scripting language is the ANSYS Parametric Design Language (APDL). Moreover, although illustrated as separate scripts, analysis control scripts may be implemented as a single script that interacts with structural analysis engine 27 to automatically create an appropriate model based on the specific input data provided by user 18.

Once the analysis is completed, execution module 26 controls the delivery of the report to user 18. As one example, execution module 26 may deliver analysis report 29 to user 18 in the form of an electronic mail (email) message 30. Depending on the success of the analysis, user 18 may receive an email message 30 containing analysis report 29 as an attachment, or receive an error message. Alternatively, execution module 26 may communicate analysis report 29 to user interface module 22 for presentation to user 18 via a conventional web browser.

As illustrated in FIG. 2, mill roll analysis system 4 provides a centralized system for modeling and evaluating mill roll designs. In one embodiment, mill roll analysis system 4 operates within an application service provider (ASP) computing environment in which application server 21 electronically communicates with data system located within suppliers 6, distributors 8, or both. In particular, the data system may electronically communicate data to mill roll analysis system 4 to define new mill roll coverings, mill roll applications, or both. The data systems may, for example, upload relevant information for newly developed roll coverings 12. In addition, the data systems may upload new analysis control scripts 28 as new mill roll applications are developed, and may modify the existing analysis control scripts. System administrators for the various enterprises, (e.g., roll covering suppliers 6, distributors 8 and/or manufacturers 10) may configure mill roll analysis system 4. A system administrator may, for example, manage accounts for authorized users including setting access privileges, and defining a number of corporate and user preferences. By interacting with user interface module 22, the system administrators may define individual access rights for controlling the functionality of mill roll analysis system 4 on a per-user basis.

Figure 3:
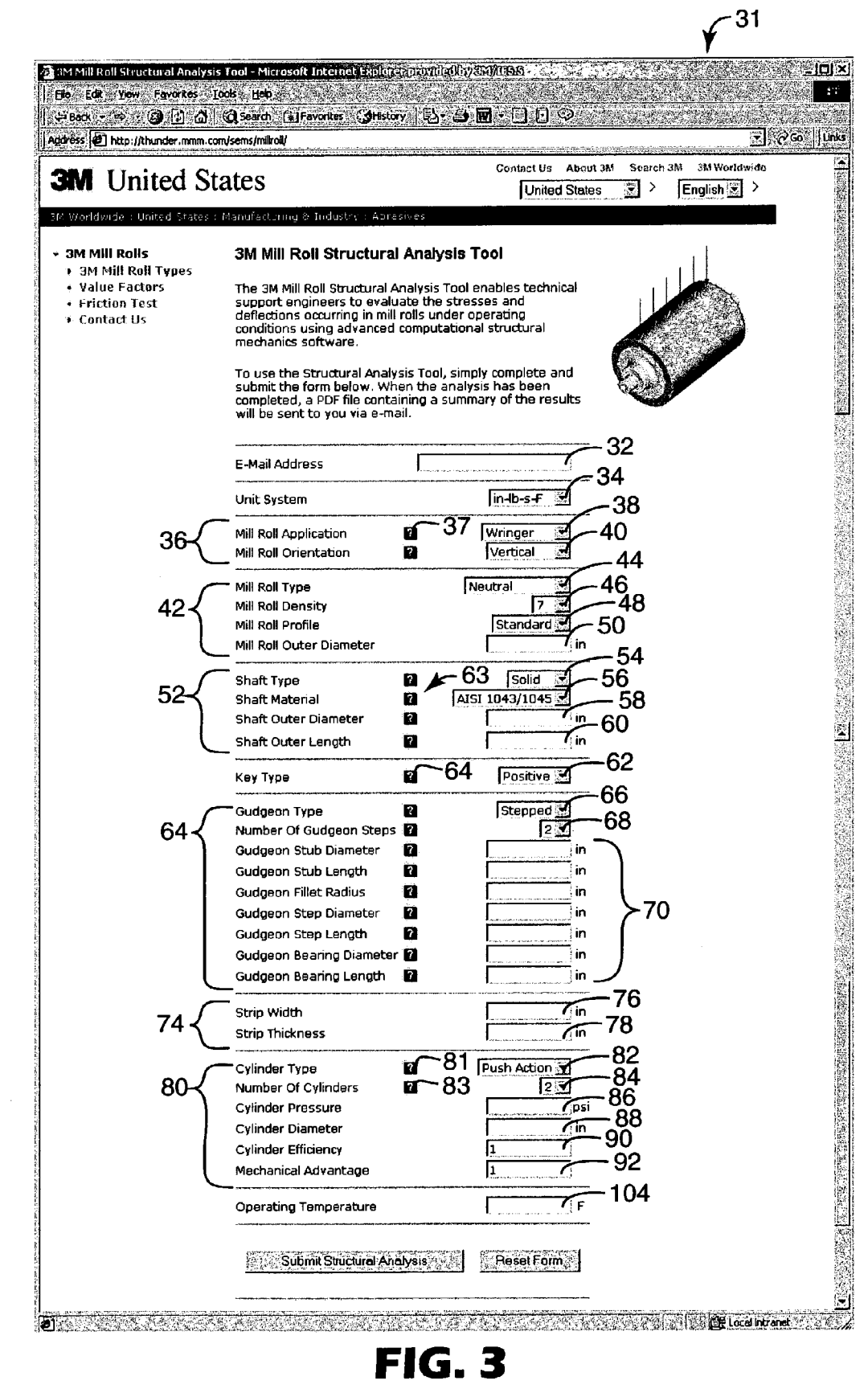

FIG. 3 illustrates an exemplary user interface 31 presented by user interface module 22 for capturing input data for modeling mill rolls. As illustrated in FIG. 3, user interface 31 includes an input area 32 for receiving an e-mail address of remote user 18. As described above, mill roll analysis system 4 provides electronic reports that may be presented via user interface module 22, or that may be mailed electronically to the user based on the network address provided in input area 32.

User interface 31 further includes an input area 34 with which the user interacts to select the particular units he or she wishes to provide as the input data. For example, input area 34 may allow the user to select between English and metric units.

Figure 4:
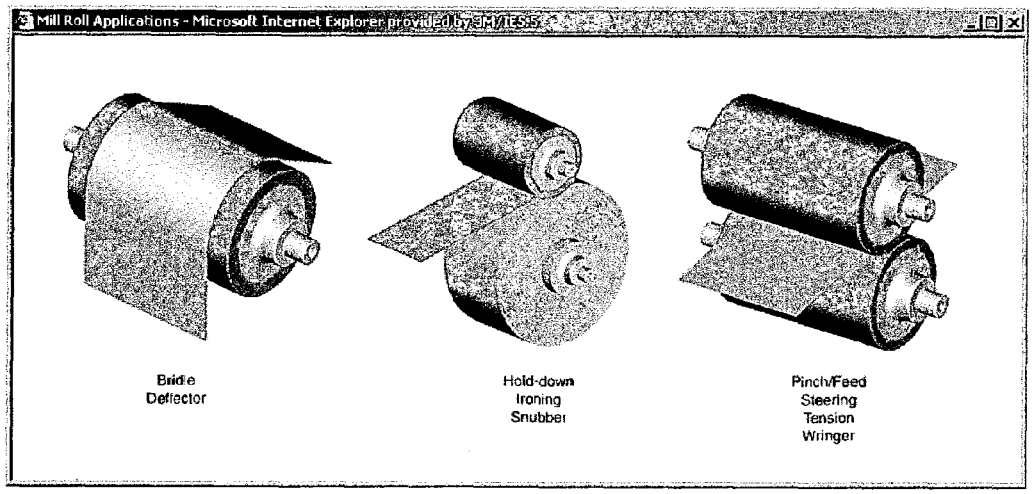

User interface 31 further includes an input region 36 to receive data that specifies a particular application and orientation of the mill roll being modeled. More specifically, input region 36 includes input area 38 that allows the user to select one of a plurality of defined mill roll applications. Each selectable application corresponds to a particular use for a mill roll within the metal processing industry. In one embodiment, input area 38 allows the user to select an application from a defined set of applications including: Bridle, Deflector, Hold-Down, Ironing, Pinch/Feed, Tension and Wringer. Based on the selected application, user interface 31 allows the user to further select an orientation for the mill roll by interacting with input area 40. In particular, input area 40 allows the user to select between a vertical and a horizontal orientation. If the user is unfamiliar with the various applications available within input area 38, the user may select icon 37 to view a graphical representation of the various application, as illustrated in FIG. 4.

User interface 31 further includes an input region 42 for capturing specific information and input data for the mill roll itself. In particular, input region 42 includes an input area 44 that allows the user to select a type of mill roll covering, i.e., the base material used for the industrial covering. Possible options include, for example, "NEUTRAL", "CX", "D", "RK", which are product designations for commercially available mill rolls from 3M Company of St. Paul, Minn. Alternatively, or in addition, input area 42 may allow the user to select a variety of general types of mill roll coverings including, for example, rubber, non-woven, and urethane.

Based on the roll type selected within input area 44, the user may further select a mill roll density within a range of densities provided by input area 46. For "NEUTRAL" mill roll types, the user is allowed to select a mill roll density of 3, 5, 7, 9 and 11, which are density designations used by 3M Company. For a mill roll of type "CX" or "D", the user is allowed to select a density of 5 or 7.

Figure 5:
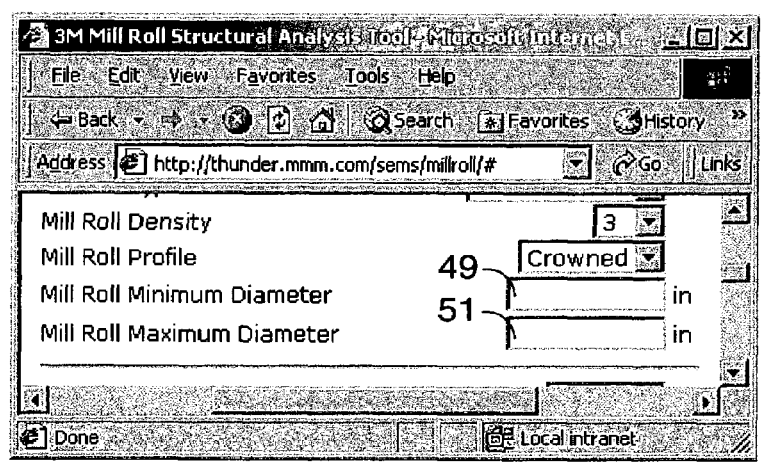

Input region 42 further includes input area 48 that allows the user to specify a profile for the mill roll. In particular, the user may select a standard profile to indicate that the mill roll is cylindrical. Alternatively, the user may select a crown profile to indicate that the diameter of the mill roll is greater in the center of the mill roll than at the ends of the mill roll. For standard profiles, input region 42 includes an input area of 50 that allows the user to specify an outer diameter for the mill roll. In response to the selection of a crown profile in input area 58, however, user interface 31 is dynamically updated to include input fields 49, 51 that allow the user to specify a minimum diameter and a maximum diameter for the mill roll, respectively, as illustrated in FIG. 5.

User interface 31 includes input region 52 for receiving input data that describes the shaft of the mill roll. In particular, user interface 31 includes an input area 54 that allows the user to characterize the shaft as either solid or hollow. Input area 56 allows the user to select one of a variety of defined materials for the shaft. Input area 58 allows the user to define an outer diameter for the shaft, while input area 60 allows the user to define an outer length for the shaft.

Figure 6:
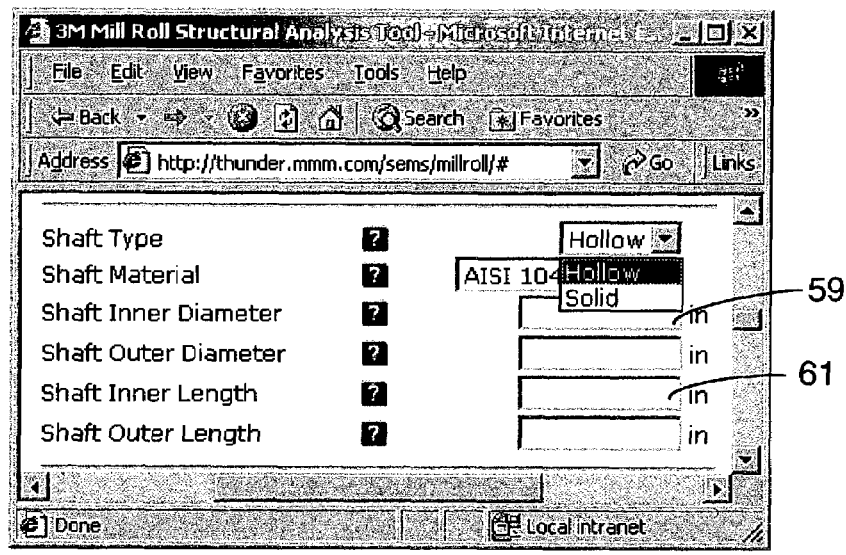
Figure 7A:
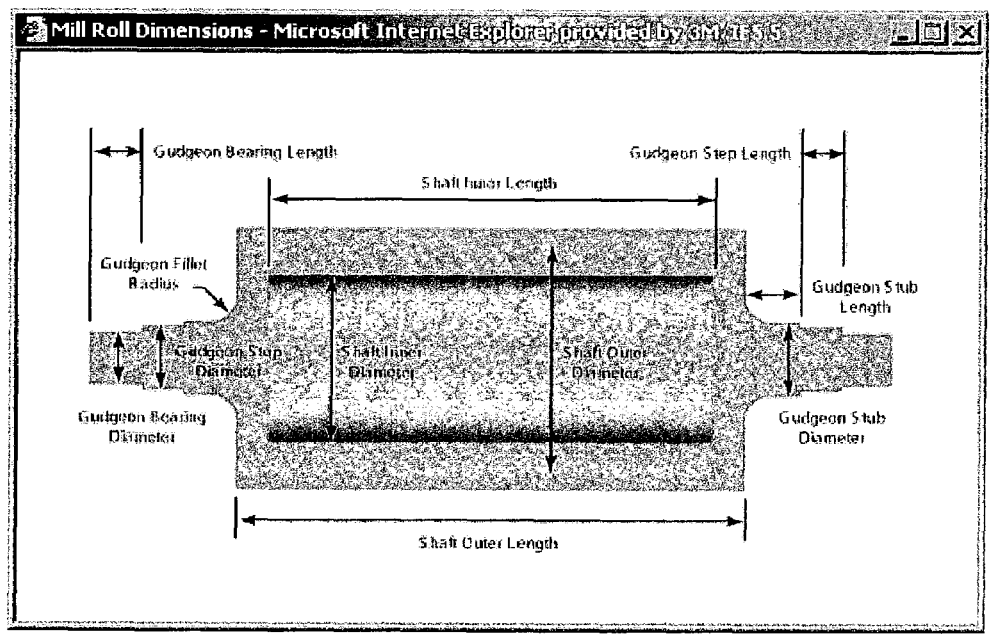
Figure 7B:
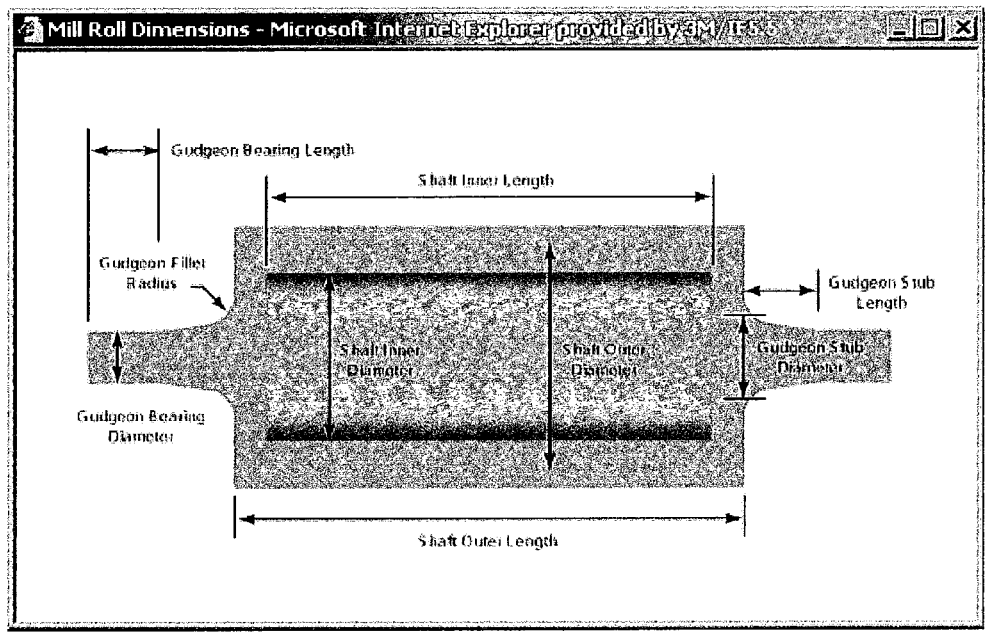
Figure 7C:
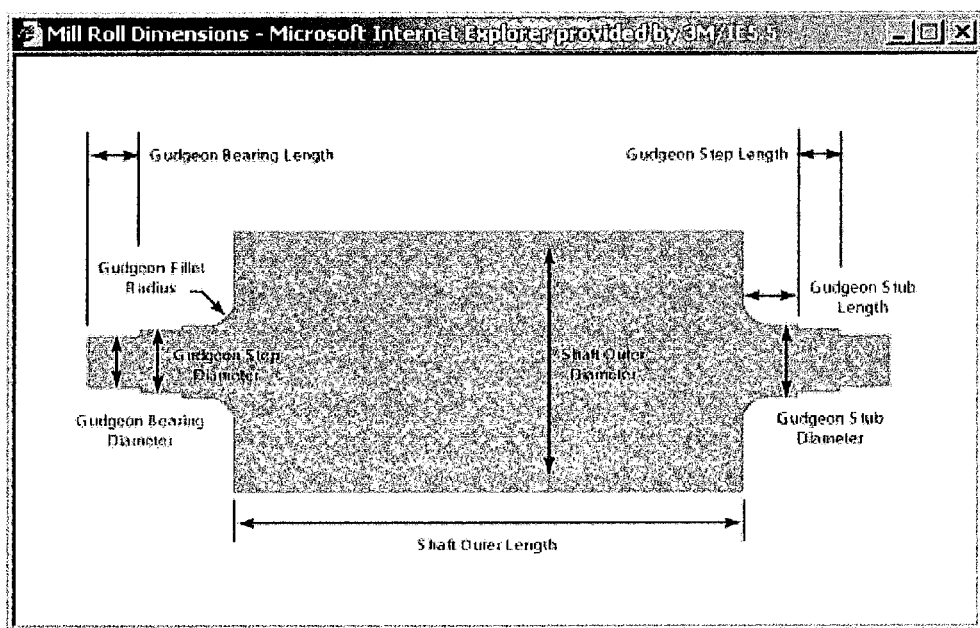
Figure 7D:
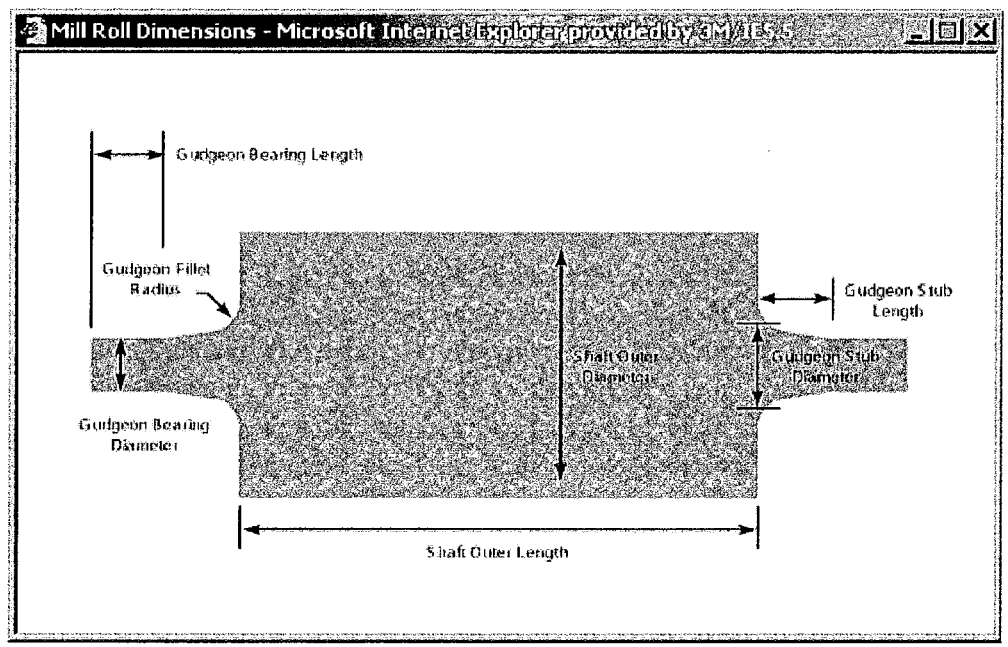

As illustrated in FIG. 6, user interface 31 automatically updates input region 52 of user interface 31 to include additional fields 59, 61 when the user indicates the shaft is of type hollow. In particular, input field 59 allows the user to select an inner diameter for the hollow shaft, while input area 61 allows the user to select an inner length for the shaft. Selecting any of help icons 63 causes user interface 31 to present a graphical illustration of the shaft, including the dimensions that may be specified by the user, as illustrated in FIGS. 7A-7D. More specifically, FIGS. 7A through 7D graphically illustrate the mill roll being designed based on the current user selections, including hollow and solid shaft designs and various gudgeon types.

Figure 8:
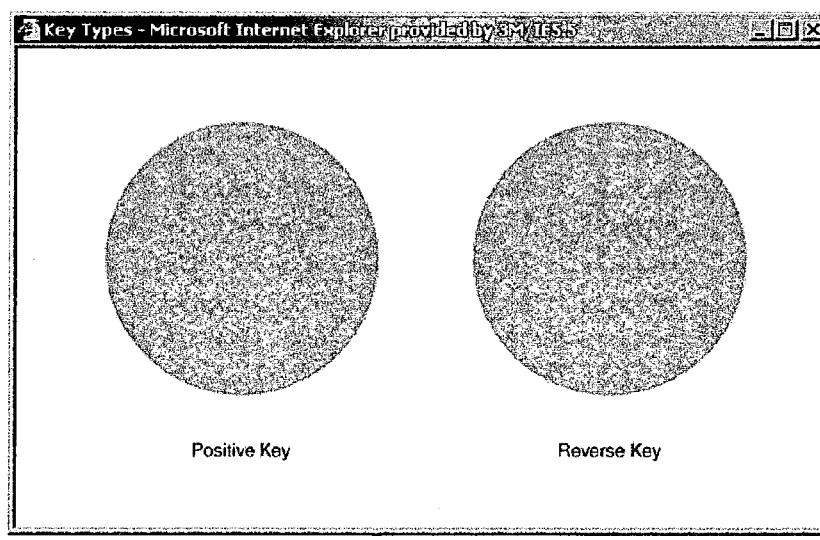

Input area 62 allows the user to indicate whether the mill roll is of positive or reverse key type. For example, a positive key type indicates that the shaft includes an additional metal piece or other component to rotationally fix the shaft to the covering. A reverse key type indicates that the covering itself includes an additional piece to rotationally fix the cover to the shaft. For assistance, the user may select help icon 64, causing the system to graphically illustrate the key types, as depicted in FIG. 8.

Input region 64 allows the user to enter a variety of input data to define the characteristics of the end of the shaft. In particular, input area 66 allows the user to specify a type of gudgeon (e.g., a stepped or tapered gudgeon). In response to a selection of stepped gudgeon type, user interface 31 dynamically includes an input field 68 that allows the user to identify the number of steps in the gudgeon (e.g., one or two steps). Input areas 70 allow the user to specify a variety of dimensions for the gudgeon, including a stub diameter, a stub length, a fillet radius, a step diameter, a step length, a bearing diameter and a bearing length.

Figure 9A:
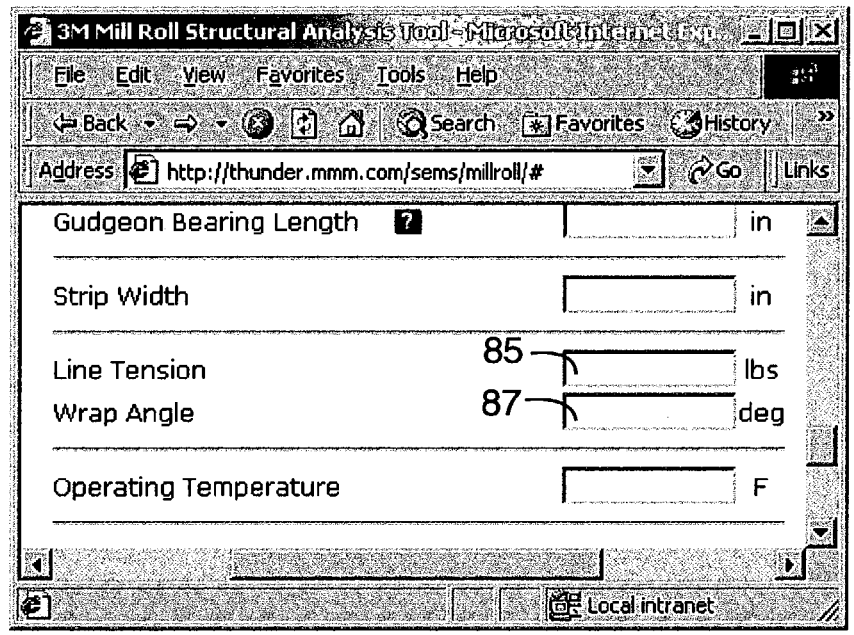
Figure 9B:
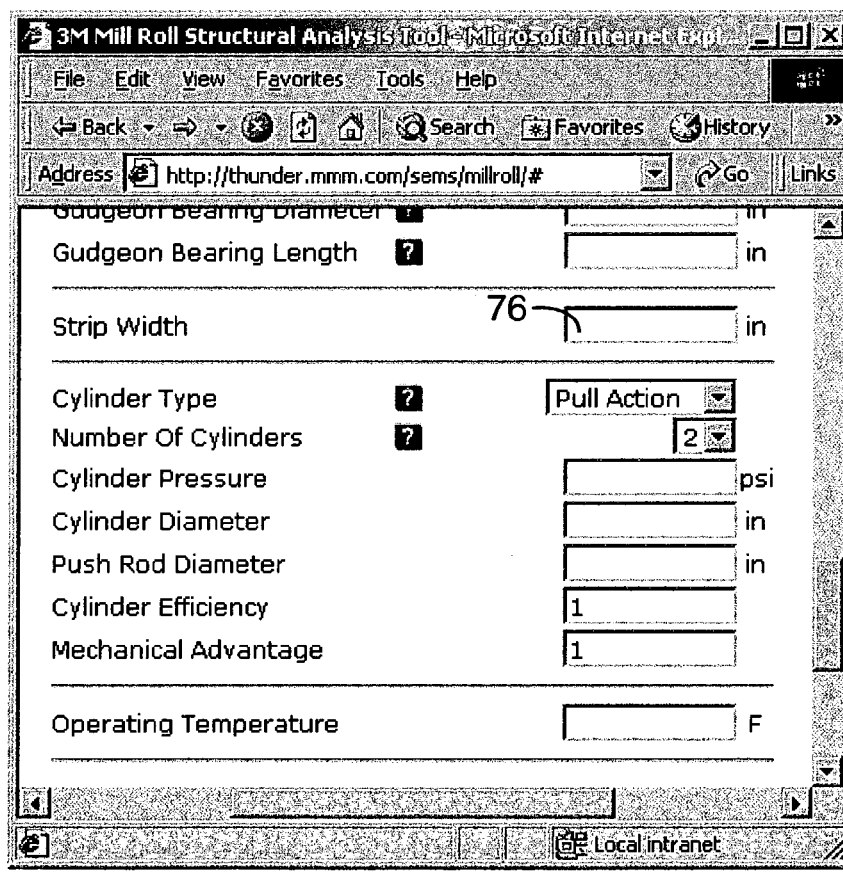

Input region 74 allows the user to specify a variety of application-specific information, as selected in input field 38. Based on the mill roll application selected in input area 38, user interface 31 dynamically updates input region 84 to include or exclude certain fields. For example, for mill roll applications of type Wringer, Pinch/Feed, Steering and Tension, user interface 31 includes input area 76, 78 that allow the user to define a "strip width" and a "strip thickness," respectively, for a continuous metal sheet. For mill roll applications of type Hold-Down, Ironing, and Snubber, user interface 31 automatically updates input region 74 to include input area 76 and exclude input area 78, as indicated by FIG. 9B.

Figure 10:
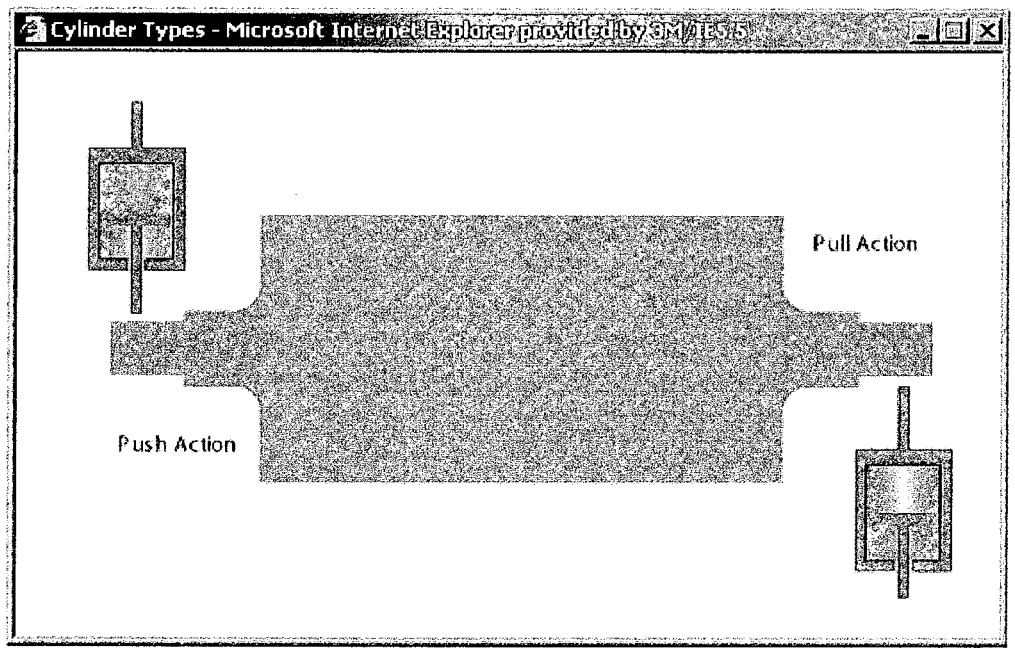
Figure 11:
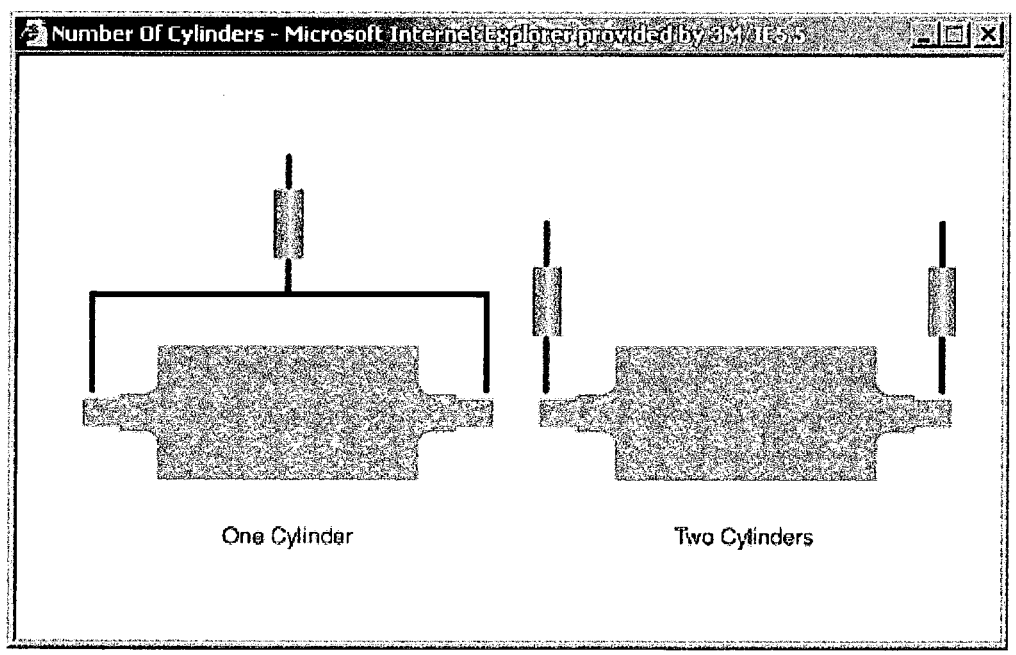

Based on the mill roll application selected in input area 38, user interface 31 dynamically updates input region 80 to include or exclude certain fields. For example, for application types Bridle and Deflector, user interface 31 updates input region 80 to include input areas 85 and 87, as illustrated in FIG. 9A, that allows the user to specify a line tension and a wrap angle around the mill roll, respectively. For other application types (e.g., Hold-Down, Ironing, Snubber, Pinch/Feed, Steering, Tension, and Wringer) input region 80 allows the user to provide a variety of data that define and characterize one or more actuating cylinders that engage the mill roll being modeled, as illustrated in FIG. 3. In particular, based on the mill roll application selected in input area 38, input region 80 includes input area 82 that allow the user to specify whether the cylinder is of push type or pull type. Input area 84 allows the user to specify the number of cylinders that engage the mill roll. To assist the user in determining the type of the cylinder, user interface 31 graphically illustrates push action cylinders and pull action cylinders in response to help icon 81, as illustrated in FIG. 10. Similarly, in response help icon 83, user interface 31 graphically illustrates mill rolls having one and two cylinders, as depicted in FIG. 11.

In addition, input area 86 allows the user to specify a pressure that is delivered to the cylinders to actuate the mill roll. Input area 88 allows the user to specify a diameter for the cylinder. Input area 90 allows the user to specify an efficiency for the cylinder to model situations where an cylinder is less than 100 percent efficient. Input area 92 allows the user to define a mechanical advantage achieved by the cylinder. Input area 104 allows the user to specify an operating temperature for the process in which the mill roll is to be modeled.

Figures 12, 14:
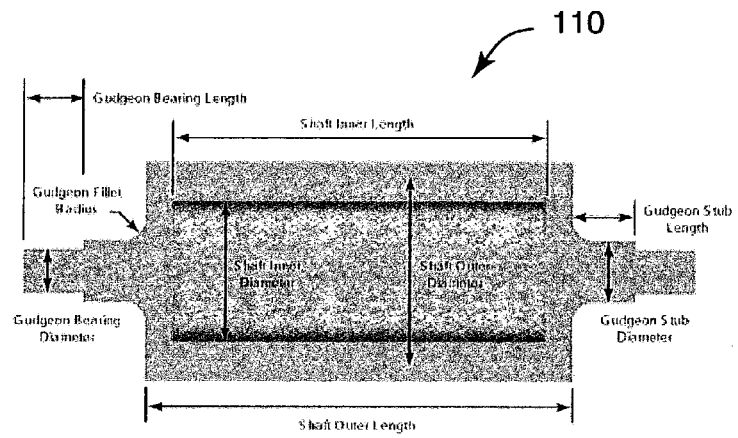

FIGS. 12-16 illustrate an example electronic analysis report 29 (FIG. 2). In particular, FIG. 12 illustrates a first portion 110 of the analysis report that graphically illustrates the mill roll as defined by the input data and evaluated by structural analysis engine 27. In this manner, FIG. 12 provides graphical confirmation to the user that the dimensions and characteristics of the mill roll as defined, and may not be to scale.

FIG. 13 illustrates a second portion 112 of the analysis report that provides a detailed list of all of the input data captured by user interface 31. In other words, second portion 112 lists all input data contained within parameter file 25, as generated by input processing module 24, and used as input parameters to structural analysis engine 27.

FIG. 14 illustrates a third portion 113 of the analysis report and includes a first output region 116 and a second output region 120. First output region 116 provides key computations produced by structural analysis engine 27, including a calculated mass of the mill roll cover, and a calculated mass of the shaft. Second output region 120 provides a number of computed results for the defined mill roll. For example, as illustrated in FIG. 14, the modeling report includes a maximum shaft displacement, a maximum shaft stress, a maximum compressive stress, a maximum tensile stress, a maximum contact pressure, and a bearing load. Each of these calculations determines whether the calculated result exceeds specified limits, as may be defined by suppliers 6 or distributors 8. In this example, the maximum shaft displacement exceeds a defined limit for the maximum shaft displacement for the mill roll. As a result, third portion 113 of the analysis report may highlight the result in red to identify any exceeded specified limits.

Figure 15A:
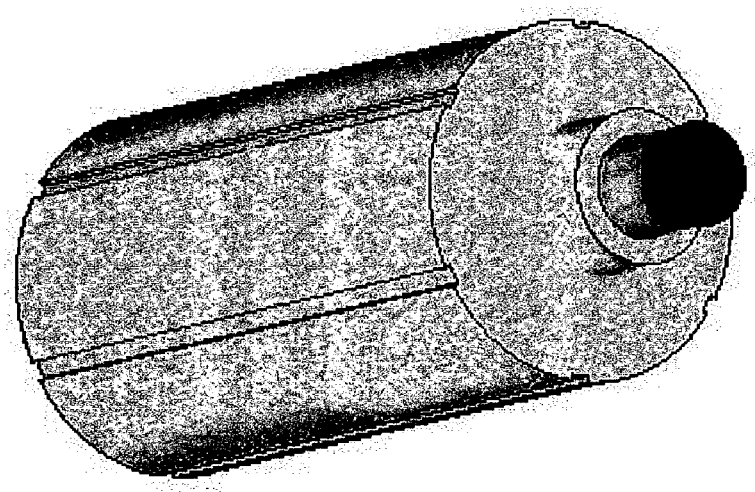
Figure 15B:
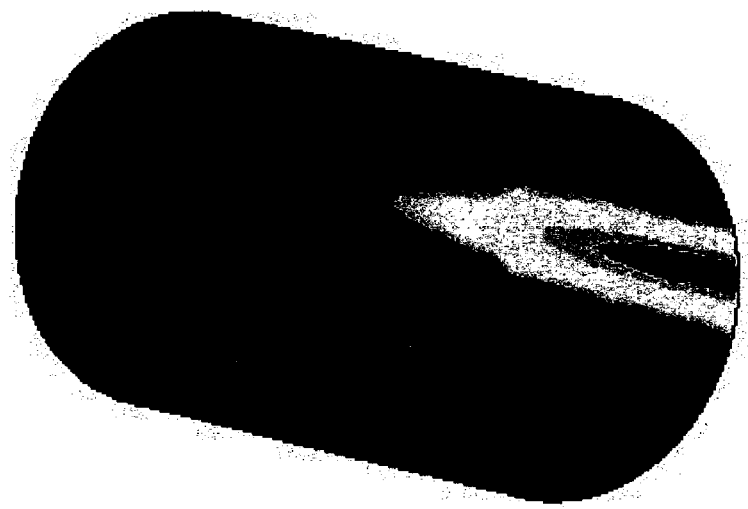
Figure 15C:
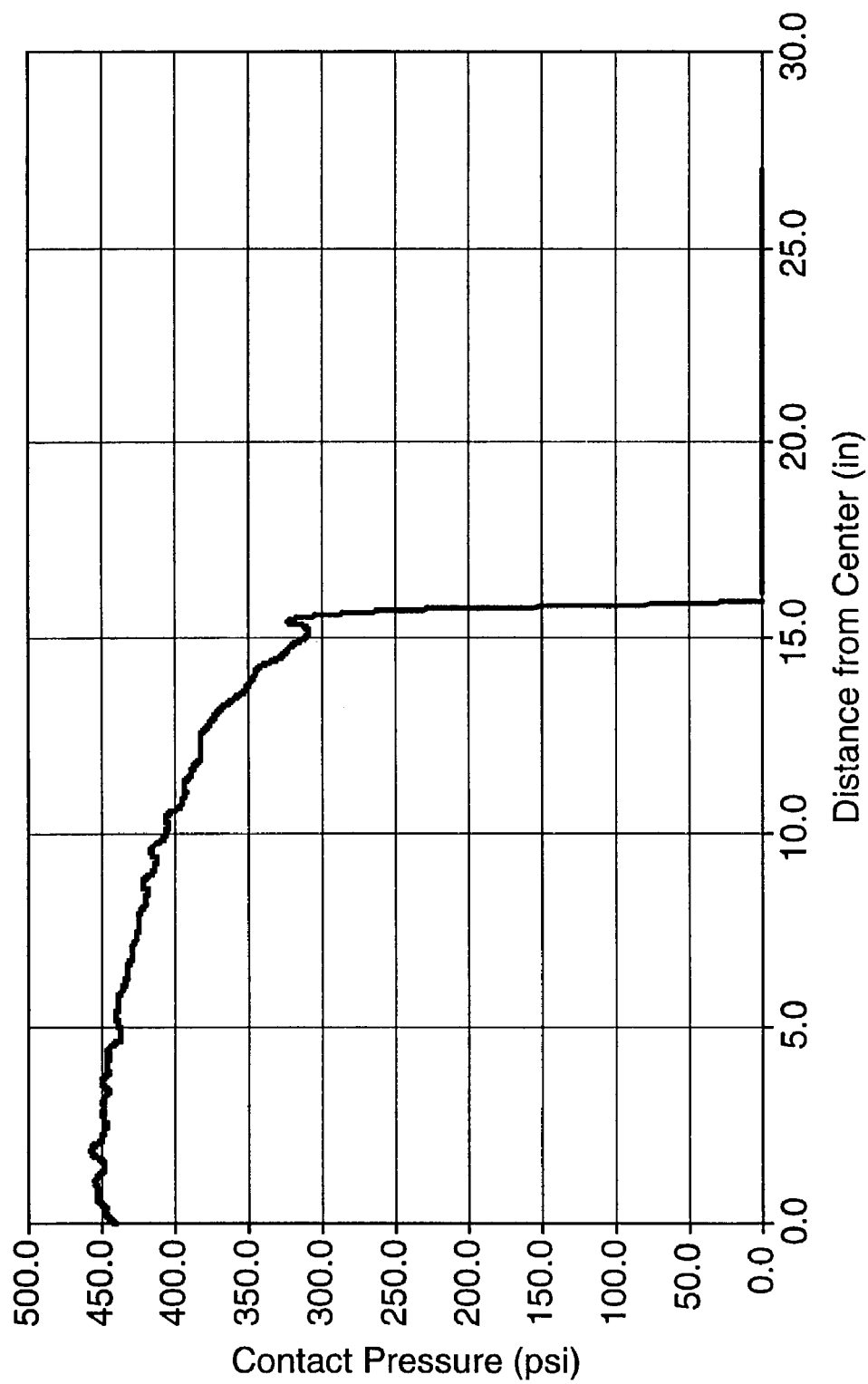

FIGS. 15A through 15C illustrate portions of the electronic report that graphically illustrate the stresses and displacements computed for the modeled mill roll. In particular, FIG. 15A graphically illustrates displacement contours within the shaft. FIG. 15B graphically illustrates contact pressure contours on the surface of the mill roll. FIG. 15C graphically illustrates contact pressure as a function of a distance from the center of the mill roll.

FIG. 16 illustrates a portion 130 of the analysis report in which analysis control script 28 formats the report to summarize the analytical results. In general, analysis control script interacts with structural analysis engine 27 and formats the analysis report 29 to identify mill roll properties that may fall outside specified limits, and may include recommendations for modifying the mill roll design. In this example, structural analysis engine 27 has calculated a maximum displacement of the shaft, which exceeds the recommended limit of 0.508 millimeters. As a result, analysis control script 28 formats analysis report 29 to suggest modification of the shaft dimensions or type in order to reduce the shaft displacement. Portion 130 further indicates that the maximum stress in the shaft is less than the yield stress of the shaft material, and thus proper operation is expected. In addition, the maximum stress in the shaft is less than one-half the yield stress of the shaft material, and therefore proper operation is expected.

Figure 17:
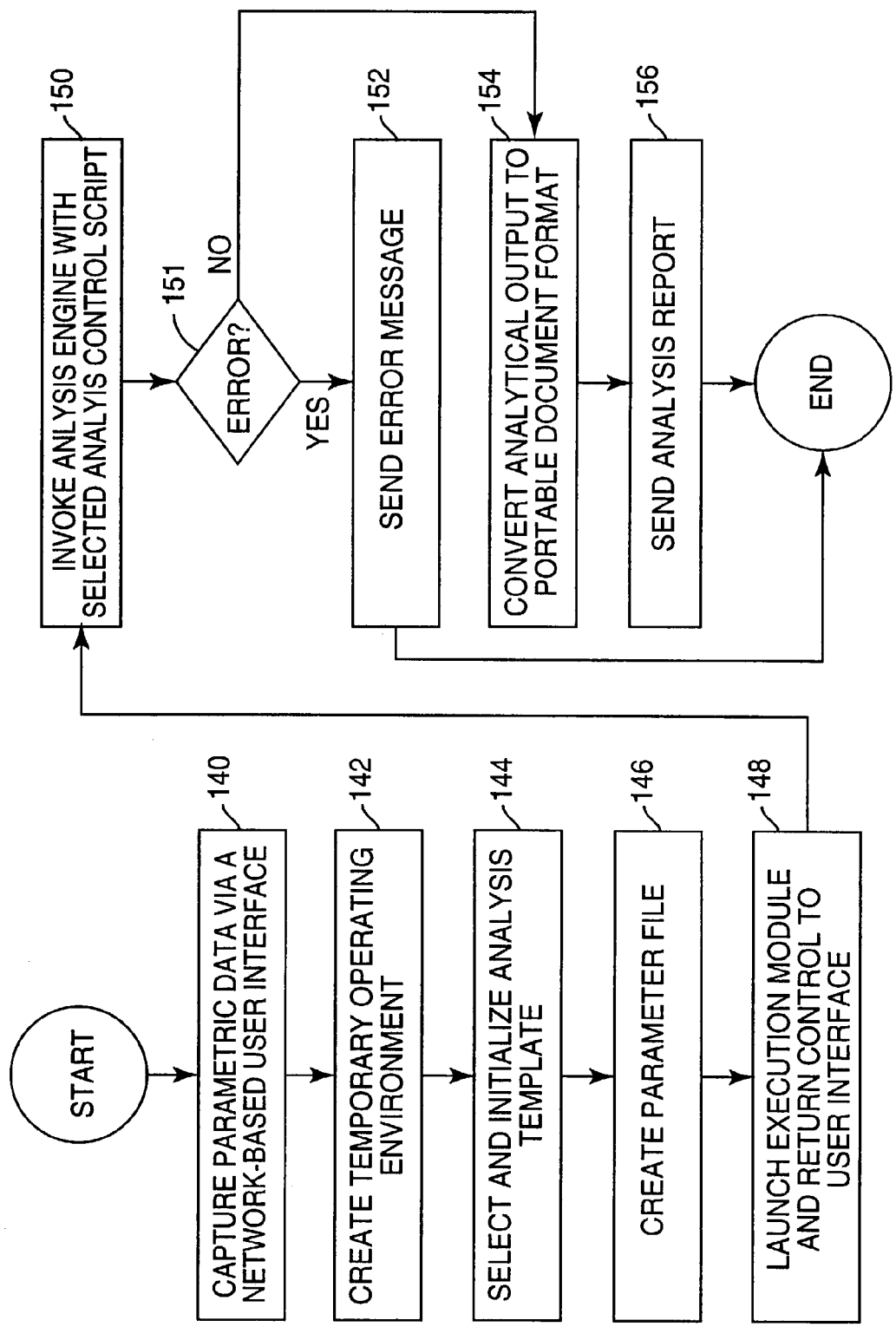
FIG. 17 is a flowchart illustrating exemplary operation of the mill roll analysis system.

FIG. 17 is a flowchart illustrating exemplary operation of mill roll analysis system 4. Initially, user interface module 22 presents a web-based user interface, (e.g., user interface 31), to capture input data from a user 18 that describes a mill roll design (140). As described above, the user selects a mill roll application from a set of predefined mill roll applications, a mill roll type from a set of predefined mill roll types, and provides a variety of input data to describe the design.

In response to the submitted data, user interface module 22 invokes input processing module 24 to process the data supplied by the user to create temporary operating environment for evaluating the described design (142). In particular, input processing module 24 selects one of analysis control scripts 28 based on the specified type of mill roll application, and copies the selected analysis template into a scratch directory (144). In addition, input processing module 24 generates a parameter input file 25 based on the input received from user interface module 22 (146). Parameter input file 25 specifies parameter values in a format suitable for processing by structural analysis engine 27. Finally, input processing module 24 spawns execution module 26, and returns control to user interface module 22, thus allowing the user to terminate remote access of mill roll system 4 or to continue interacting with the user interface module to define a new mill roll design for analysis (148).

In parallel, execution module 26 invokes structural analysis engine 27 and passes a reference, (e.g., a file name), that identifies the selected analysis control script 28 to control operation of the structural analysis engine based on the particular mill roll application and input data specified by user 18 (150). If any errors occur during the analysis (151), execution module 26 sends an error message to user 18 (152). Otherwise, execution module 26 converts the analytical output generated by structural analysis engine 27 and the selected analysis control script 28 into an easily readable format, (e.g., the portable document format (PDF)) (154). Finally, execution module 26 communicates the analysis report to user 18, (e.g., via electronic mail (email) message 30 or via user interface module 22) (156).

Figure 18:
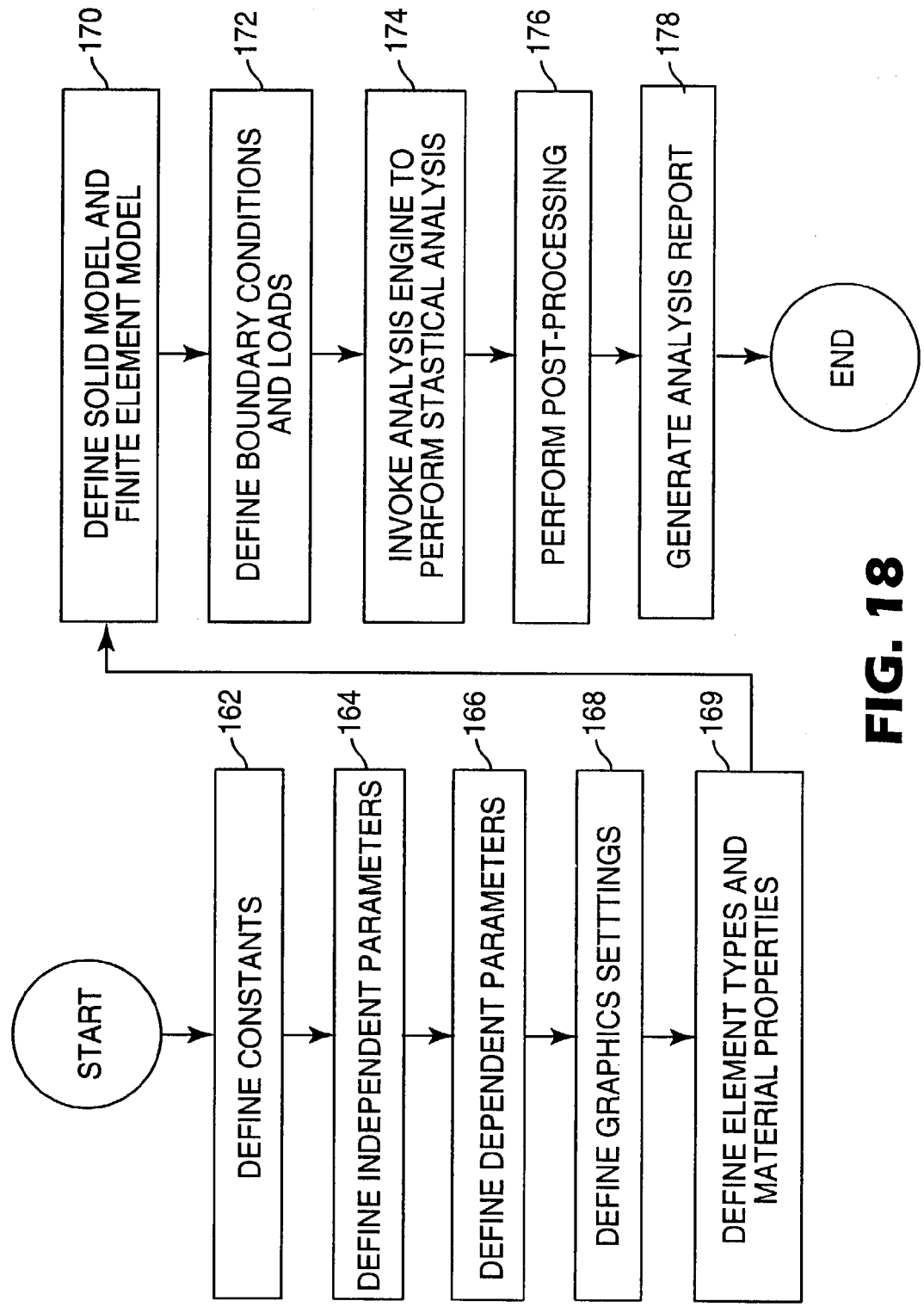
FIG. 18 is a flowchart illustrating exemplary operation of an analysis control script to automatically control operation of a structural analysis engine based on the input data provided by a remote user.

FIG. 18 is a flowchart illustrating exemplary operation of analysis control script 28 to control operation of structural analysis engine 27. In general, analysis control script 28 is written in a format suitable for processing by structural analysis engine 27, and directs the structural analysis engine to create a model based on the mill roll application, mill roll type, and other input data provided by the user.

Initially, analysis control script 28 issues commands to structural analysis engine to define constants relevant to the mill roll analysis (162). For example, analysis control script may define conversions, such as millimeters per inch, Newtons per pound, and the like.

Next, analysis control script 28 reads parameter input file 25, and issues commands to structural analysis engine to define relevant independent parameters and any dependent parameters (164, 166). For example, based on the mill roll application type and other input data, analysis control script 28 may define a maximum deflection, densities of steel, and yield stresses of steel, hardness values, strip pressures, and cylinder forces. In addition, analysis control script 28 issues commands to structural analysis engine to define graphics settings for plotting the results of the analysis (168). Analysis control script 28 issues commands to structural analysis engine to define element types and material properties relevant for evaluation of a mill roll design based on the input data (169). For example, based on the selected application and other input data, analysis control script 28 defines values for properties of a mill roll (e.g., elastic modulus, mass density, Poisson's ratio, and yield stress values of the shaft).

Next, analysis control script 28 issues commands to structural analysis engine to define a finite element model for the mill roll design based on the selected mill roll application, type, and other input data (170). Finally, analysis control script 28 issues commands to structural analysis engine 27 to define boundary conditions and loads for the modeled mill roll (172). In this manner, analysis control script 28 may automatically create the appropriate model based on the input data. The resultant model may conform to conventional modeling techniques used for mill roll analysis, and may include linear or nonlinear material behavior, nonlinear bearing support constraints, and nonlinear surface-to-surface contact regions. Analysis engine 27 may generate a system of equations derived from theoretical equations governing deformable body structural mechanics, including the continuity equation, and the conservation of mass, momentum, and energy. The theoretical aspects of this area of continuum mechanics are documented in numerous sources, include J. Bonet and R. D. Wood, "Nonlinear Continuum Mechanics for Finite Element Analysis", 1997, Cambridge University Press, Cambridge, England (ISBN 0-521-57272-X), and A. C. Eringen, "Mechanics of Continua", 1980, Robert E. Krieger Publishing Company, Inc., Melbourne, Fla. (ISBN 0-88275-663-X). The theoretical aspects of the finite element method are also documented in numerous sources, including T. Belytschko, W. Liu, and B. Moran, "Nonlinear Finite Elements for Continua and Structures", 2000, John Wiley and Sons, Ltd., West Sussex, England (ISBN 0-471-98774-3), and O. C. Zienkiewicz and R. L. Taylor, "The Finite Element Method", 1989, McGraw-Hill Book Company, Maidenhead, England (ISBN 0-07-084174-8), the contents of which is incorporated herein by reference.

Upon creating the appropriate mill roll model in response to the input data, analysis control script 28 issues commands to direct structural analysis engine to analyze the model (174). Once the analysis has completed, analysis control script 28 performs a number of post-processing tasks (176). For example, analysis control script 28 directs structural analysis engine 27 to output contour plots in graphical form, (e.g., JPEG). In addition, analysis control script 28 directs structural analysis engine 27 to identify maximum displacements and stresses for the design.

Finally, analysis control script 28 generates an analysis report based on the analytical output produced by structural analysis engine 27 (178). As described above, execution module 26 converts the report to an easily readable format, and communicates the report to user 18.

Various implementations and embodiments of the invention have been described. Nevertheless, it is understood that various modifications can be made without departing from the invention. Accordingly, these and other embodiments are within the scope of the following claims.

The invention claimed is:

1. A system comprising:
   a user interface module that receives input data from a user via a computer network, wherein the input data defines a mill roll design;
   a structural analysis engine; and
   an analysis control script to automatically direct the structural analysis engine to define and evaluate an analytical model for the mill roll design based on the input data, wherein the definition and evaluation of the analytical model for the mill roll includes computing displacement values or stress values or stress values for the mill roll defined by the mill roll design.

2. The system of claim 1, further comprising an input processing module to process the input data supplied by the user, and to create a temporary operating environment for the structural analysis engine to evaluate the analytical model.

3. The system of claim 2, wherein the input processing module processes the input data and generates a parameter input file in a format suitable for processing by the structural analysis engine.

4. The system of claim 2, wherein the input processing module selects the analysis control script from a plurality of analysis control scripts as a function of the input data, wherein each of the analysis control scripts directs the structural analysis engine to define and evaluate a different analytical model.

5. The system of claim 4, wherein the input processing module creates a scratch directory for use as the temporary operating environment, and copies the selected analysis control script into the scratch directory.

6. The system of claim 1, wherein the analysis control script conforms to a scripting language for invoking the structural analysis engine.

7. The system of claim 1, wherein the user interface module presents a network-based user interface to receive the input data from the user.

8. The system of claim 7, wherein the user interface includes an input area that presents a set of predefined mill roll applications for selection by the user, and the analysis control script directs the structural analysis engine to automatically define and evaluate the analytical model based on the selected mill roll application.

9. The system of claim 8, wherein the user interface module dynamically updates the user interface based on the selected mill roll application to contain one or more input fields for specifying at least a strip width and a strip thickness for metal to be processed by the mill roll.

10. The system of claim 8, wherein the set of predefined mill roll applications includes Bridle, Deflector, Hold-Down, Ironing, Pinch/feed, Tension and Wringer.

11. The system of claim 7, wherein the user interface module presents graphical representations of the mill roll applications to assist the user selection.

12. The system of claim 7, wherein the user interface includes an input area that presents a set of predefined mill roll orientations for selection by the user and facilitates selection of a mill roll orientation by the user, and the analysis control script directs the structural analysis engine to automatically define and evaluate the analytical model based on the selected mill roll orientation.

13. The system of claim 7, wherein the user interface includes an input area that presents a set of predefined mill roll coverings for selection by the user and facilitates selection of a mill roll orientation by the user, and the analysis control script automatically directs the structural analysis engine to define and evaluate the analytical model based on the selected mill roll covering.

14. The system of claim 7, wherein the user interface includes an input area that presents a set of predefined mill roll profiles for selection by the user, and the user interface module dynamically updates the user interface based on the selected profile to contain one or more input fields for specifying a minimum diameter and a maximum diameter for the mill roll.

15. The system of claim 7, wherein the user interface includes an input area to select at least one of a hollow shaft or a solid shaft for the mill roll design, and the user interface module dynamically updates the user interface based on the selected shaft to contain one or more input fields for specifying at least an inner diameter or an outer diameter for the shaft, and at least one of inner length or an outer length of the shaft.

16. The system of claim 7, wherein the user interface includes at least one input area to define one or more of a number of actuating cylinders that engage the mill roll, whether the cylinders are of push type or pull type, a pressure delivered to the cylinders, an efficiency for the cylinders, and a mechanical advantage achieved by the cylinders.

17. The system of claim 7, wherein the user interface includes at least one input area to define at least one of a line tension or a wrap angle for the mill roll.

18. The system of claim 1, wherein the user interface includes input areas to specify at least one of a type of gudgeon for a shaft for the modeled mill roll, a number of steps in the gudgeon, a stub diameter for the gudgeon, a stub length for the gudgeon, a fillet radius for the gudgeon, a step diameter for the gudgeon, a bearing diameter for the gudgeon and a bearing length for the gudgeon.

19. The system of claim 1, further comprising an execution module invoked by the input processing module, wherein the execution module initiates operation of the structural analysis engine and directs the structural analysis engine to operate in accordance with the analysis control script.

20. The system of claim 19, wherein the execution module directs the structural analysis engine to evaluate the model to compute analytical output data including the displacement values and stress values.

21. The system of claim 19, wherein the execution module processes the analytical output data to produce an analysis report in a format viewable by the user.

22. The system of claim 21, wherein the format includes at least one of hypertext markup language (HTML) format or a portable document format (PDF).

23. The system of claim 21, wherein the execution module communicates the analysis report to the user via an electronic mail (email) message.

24. The system of claim 21, wherein the structural analysis engine computes values representing stresses and deflections in the shaft, and the analysis control script formats the analysis report to highlight any of the calculated values that exceed a respective limit value.

25. The system of claim 24, wherein the computed values include at least one of a maximum shaft displacement, a maximum shaft stress, a maximum compressive stress, a maximum tensile stress, a maximum contact pressure, and a bearing load.

26. The system of claim 21 wherein the execution module generates the analysis report to include at least one recommendation for modifying the input data.

27. A method comprising:
receiving input data from a user via a computer network, wherein the input data defines a mill roll design:
invoking an analysis control script to automatically direct a structural analysis engine to define and evaluate an analytical model for the mill roll design based on the input data, the definition and evaluation of the analytical model including a computation of at least a displacement value or a stress value for the mill roll defined by the mill roll design; and
communicating an analysis report to the user that contains analytical results from the structural analysis engine.

28. The method of claim 27 further comprising:
processing the input data supplied by the user to generate a parameter file for the structural analysis engine; and
creating a temporary operating environment for evaluation of the analytical model.

29. The method of claim 27, wherein invoking an analysis control script comprises selecting the analysis control script from a set of analysis control scripts as a function of the input data, wherein each analysis control script directs the structural analysis engine to define and evaluate a different model.

30. The method of claim 27, wherein the analysis control script conforms to a scripting language for invoking the structural analysis engine.

31. The method of claim 27, further comprising presenting a network-based user interface to receive the input data from the user.

32. The method of claim 31, further comprising:
presenting the user interface to include a set of predefined mill roll applications for selection by the user, and
automatically directing the structural analysis engine to define and analytical model based on the selected mill roll application.

33. The method of claim 31, further comprising dynamically updating the user interface based on the selected mill roll application to contain one or more input fields for specifying a strip width and a strip thickness for metal to be processed by the mill roll.

34. The method of claim 32, wherein the set of predefined mill roll applications includes Bridle, Deflector, Hold-Down, Ironing, Pinch/Feed, Tension and Wringer.

35. The method of claim 32, further comprising presenting graphical representations of the mill roll applications to assist the user selection.

36. The method of claim 31, further comprising:
presenting the user interface to include a set of predefined mill roll orientations for selection by the user, and
automatically directing the structural analysis engine to define and evaluate the analytical model based on the selected mill roll orientation.

37. The method of claim 31, further comprising:
presenting the user interface to include a set of predefined mill roll coverings for selection by the user, and
automatically directing the structural analysis engine to define and evaluate the analytical model based on the selected mill roll covering.

38. The method of claim 31 further comprising:
presenting the user interface to include a set of predefined mill roll profiles for selection by the user, and dynamically updating the user interface based on the selected profile to contain one or more input fields for specifying at least one of a minimum diameter or a maximum diameter for the mill roll;
presenting the user interface to include an input area to select at least one of a hollow shaft or a solid shaft for the mill roll design, and dynamically updating the user interface based on the selected shaft to contain one or more input fields for specifying at least one of an inner diameter or an outer diameter for the mill roll.

39. The method of claim 31, further comprising:
presenting the user interface to include at least one input area to define one or more of a number of actuating cylinders that engage the modeled mill roll, whether the cylinders are of push type or pull type, a pressure delivered to the cylinders, an efficiency for the cylinders, and a mechanical advantage achieved by the cylinders; and
presenting the user interface to include input areas to specify at least one of a type of gudgeon for a shaft for the modeled mill roll, a number of steps in the gudgeon, a stub diameter for the gudgeon, a stub length for the gudgeon, a fillet radius for the gudgeon, a step diameter for the gudgeon, a bearing diameter for the gudgeon and a bearing length for the gudgeon.

40. The method of claim 27, further comprising communicating the analysis report to the user via an electronic mail message.

41. The method of claim 27, further comprising generating the analysis report to highlight any of the analytical results that exceed respective limits.

42. The method of claim 27, further comprising generating the analysis report to highlight any of the analytical results that exceed respective limits.

43. The method of claim 27, further comprising manufacturing a mill roll in accordance with the mill roll design.

44. A computer-readable medium comprising instructions to cause a programmable processor to:
present a network interface to include a set of predefined mill roll applications and a set of predefined mill roll types for selection by a user; and
automatically direct a structural analysis engine to define and evaluate an analytical model based on a selected mill roll application and a selected mill roll type, the definition and evaluation comprising, at least one of: computing a displacement value for a mill roll; computing a stress value for a mill roll.

45. The computer-readable medium of claim 44, wherein the instructions cause the programmable processor to communicate an analysis report to the user that contains analytical results from the structural analysis engine.

46. A system comprising:
a web browser executing on a remote computing device; and a mill roll analysis system coupled to the remote computing device via a network, wherein the mill roll analysis system comprises;
a web server providing an operating environment for a user interface module that present a web-interface to receive input data from the remote computing device, wherein the input data defines a mill roll design, and
an application server providing an operating environment for an analysis control script and a structural analysis engine, wherein the analysis control script automatically directs the structural analysis engine to define and evaluate an analytical model for the mill roll design based on the input data, wherein the definition and evaluation of the analytical model for the mill roll design comprises computing at least a displacement value or a stress value for the mill roll defined by the mill roll design.

47. The system of claim 46, wherein the user interface module present the user interface to includes an input area that presents a set of predefined mill roll applications for selection by the user, and the analysis control script directs the structural analysis engine to automatically define and evaluate the analytical model based on the selected mill roll application.

48. The system of clam 46, wherein the web server and application server are different computing devices.

49. A method comprising:
receiving input data from a user via a computer network, wherein the input data defines a mill roll design;
invoking a structural analysis engine to evaluate an analytical model for the mill roll design based on the input data to produce analytical results, wherein the evaluation of the analytical model for the mill roll includes computing at least a displacement value or a stress value for the mill roll defined by the mill roll design, and communicating an analysis report to the user that contains analytical results from the structural analysis engine.

50. The method of claim 49, further comprising presenting a network-based user interface to receive the input data from the user.

51. The method of claim 50, further comprising:
presenting the user interface to include a set of predefined mill roll applications for selection by the user, and
automatically directing the structural analysis engine to define and evaluate the analytical model based on the selected mill roll application.

52. The method of claim 50, further comprising:
presenting the user interface to include a set of predefined mill roll coverings for selection by the user, and
automatically directing the structural anaylsis engine to define and evaluate the analytical model based on the selected mill roll covering.

53. The method of claim 49, further comprising manufacturing a mill roll in accordance with the mill roll design.

* * * * *

UNITED STATES PATENT AND TRADEMARK OFFICE
CERTIFICATE OF CORRECTION

PATENT NO. : 7,249,004 B2
APPLICATION NO. : 10/376727
DATED : July 24, 2007
INVENTOR(S) : David D. Lindeman It is certified that error appears in the above-identified patent and that said Letters Patent is hereby corrected as shown below:

<u>Title Page</u>

Item [56], References Cited, OTHER PUBLICATIONS,
   delete " FiniteSimulation " and insert -- Finite Element Simulation -- therefor.

<u>Drawings</u>

Sheet 16 of 16, Fig. 18,
   delete " STASTICAL " and insert -- STATISTICAL -- therefor.

<u>Column 10</u>

Claim 1, Line 61, delete " stress values or stress values for "
             and insert -- stress values for -- therefor.

<u>Column 11</u>

Claim 10, Line 34, delete " Pinch/feed " and insert -- Pinch/Feed -- therefor.

<u>Column 12</u>

Claim 27, Line 53, delete " design: " and insert -- design; -- therefor.

<u>Column 13</u>

Claim 32, Line 17, delete " and analytical "
             and insert -- and evaluate the analytical --

Claim 38, Line 54, delete "mill roll" and insert -- shaft -- therefor.

UNITED STATES PATENT AND TRADEMARK OFFICE
CERTIFICATE OF CORRECTION

PATENT NO. : 7,249,004 B2
APPLICATION NO. : 10/376727
DATED : July 24, 2007
INVENTOR(S) : David D. Lindeman It is certified that error appears in the above-identified patent and that said Letters Patent is hereby corrected as shown below:

<u>Column 14</u>

Claim 42, Line 11, delete " highlight any of the analytical results that exceed respective limits. " and insert -- include at least one recommendation for modifying the input data based on the analytical results, -- therefor.

Claim 44, Line 22, delete " comprising, " and insert -- comprising -- therefor.

Claim 46, Line 34, delete " comprises; " and insert -- comprises: -- therefor.

Claim 49, Line 66, delete " design, " and insert -- design; -- therefor.

<u>Column 16</u>

Claim 52, Line 4, delete " anaylsis" and insert -- analysis -- therefor.

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,249,004 B2
APPLICATION NO. : 10/376727
DATED : July 24, 2007
INVENTOR(S) : David D. Lindeman It is certified that error appears in the above-identified patent and that said Letters Patent is hereby corrected as shown below:

Title Page

Item [56], References Cited, OTHER PUBLICATIONS,
 delete "FiniteSimulation" and insert -- Finite Element Simulation -- therefor.

Drawings

Sheet 16 of 16, Fig. 18,
 delete "STASTICAL" and insert -- STATISTICAL -- therefor.

Column 10

Claim 1, Line 61, delete "stress values or stress values for"
 and insert -- stress values for -- therefor.

Column 11

Claim 10, Line 34, delete "Pinch/feed" and insert -- Pinch/Feed -- therefor.

Column 12

Claim 27, Line 53, delete "design:" and insert -- design; -- therefor.

Column 13

Claim 32, Line 17, delete "and analytical"
 and insert -- and evaluate the analytical --

Claim 38, Line 54, delete "mill roll" and insert -- shaft -- therefor.

Column 14

Claim 42, Line 11, delete "highlight any of the analytical results that exceed respective limits." and insert -- include at least one recommendation for modifying the input data based on the analytical results. -- therefor.

UNITED STATES PATENT AND TRADEMARK OFFICE
CERTIFICATE OF CORRECTION

PATENT NO. : 7,249,004 B2
APPLICATION NO. : 10/376727
DATED : July 24, 2007
INVENTOR(S) : David D. Lindeman It is certified that error appears in the above-identified patent and that said Letters Patent is hereby corrected as shown below:

Claim 44, Line 22, delete "comprising," and insert -- comprising -- therefor.

Claim 46, Line 34, delete "comprises;" and insert -- comprises: -- therefor.

Claim 49, Line 66, delete "design," and insert -- design; -- therefor.

<u>Column 16</u>

Claim 52, Line 4, delete "anaylsis" and insert -- analysis -- therefor.

Signed and Sealed this

Twenty-fifth Day of December, 2007

JON W. DUDAS
*Director of the United States Patent and Trademark Office*